United States Patent [19]
Park

[11] Patent Number: 5,986,776
[45] Date of Patent: Nov. 16, 1999

[54] COMBINED PAPER SUPPLY AND PAPER DISCHARGE TRAY FOR AN IMAGE READING AND FORMING APPARATUS

[75] Inventor: Young-Bai Park, Gumi, Rep. of Korea

[73] Assignee: SamSung Electronics Co., Ltd., Suwon, Rep. of Korea

[21] Appl. No.: 09/009,730

[22] Filed: Jan. 21, 1998

[30] Foreign Application Priority Data

Jan. 23, 1997 [KR] Rep. of Korea .................. 97-1920

[51] Int. Cl.⁶ ..................................... H04N 1/04
[52] U.S. Cl. ........................ 358/498; 358/400; 355/72
[58] Field of Search ........................ 358/498, 496, 358/471, 400, 296; 271/3.03, 145, 162–164; 355/75, 72; 399/211; 348/463

[56] References Cited

U.S. PATENT DOCUMENTS

| | | | |
|---|---|---|---|
| 3,989,236 | 11/1976 | Komori et al. | 271/9.01 |
| 4,279,504 | 7/1981 | Brown | 355/72 |
| 4,619,388 | 10/1986 | Ono et al. | 271/272 |
| 5,013,026 | 5/1991 | Howell | 271/187 |
| 5,379,121 | 1/1995 | Yamada | 358/400 |
| 5,523,848 | 6/1996 | Musso et al. | 358/296 |
| 5,539,538 | 7/1996 | Terao | 358/498 |
| 5,552,902 | 9/1996 | Kohno | 358/498 |
| 5,559,609 | 9/1996 | Yamada | 358/400 |

*Primary Examiner*—Edward L. Coles
*Assistant Examiner*—Cheukfan Lee
*Attorney, Agent, or Firm*—Robert E. Bushnell, Esq.

[57] ABSTRACT

A combination paper supply and paper discharge tray that can be used in versatile office machines that facilitates removing paper from either the paper supply tray or the paper discharge tray without interfering with the operations of the other tray. The paper supply tray is recessable flush into the paper discharge tray so that the combination tray can be used solely as a paper discharge tray in an image forming device when there are no documents that need to have images translated into representative binary data. Additionally, the simplified design of the combination tray allows the combination paper supply and paper discharge tray to be used in facsimiles that are not specifically designed to use the combination tray.

21 Claims, 3 Drawing Sheets

COMBINED PAPER SUPPLY AND PAPER DISCHARGE TRAY FOR AN IMAGE READING AND FORMING APPARATUS

CLAIM OF PRIORITY

This application makes reference to, incorporates the same herein, and claims all rights accruing thereto under 35 U.S.C. §119 through my patent application entitled *Combined Sheet-Feeding Stacker and Sheet-Receiving Stacker for use in Facsimile* earlier filed in the Korean Industrial Property Office on the day of Jan. 23, 1997 and there duly assigned Ser. No. 1997/1920.

BACKGROUND OF THE INVENTION

1. Field of the Invention

The present invention relates to a paper tray for versatile office machines, such as a facsimile, electrophotographic apparatus, or an ink-jet printer, and, more specifically, to a combined paper supply and paper discharge tray that can be used with an image reading and forming apparatus.

2. Background Art

In general, a versatile office machine, such as a facsimile or electrophotographic device, includes a paper supply tray and a paper discharge tray, that are individually constructed. For example, in case of the facsimile, the paper supply tray is generally mounted at an incline to the rear of the facsimile along the upper middle side of the facsimile body. The paper discharge tray is commonly mounted, at an incline to the rear, on an upper rear side of the facsimile body. The original copies to be supplied to the facsimile are stacked on the paper supply tray, and the recording sheets discharged from the facsimile are stacked on the paper discharge tray. Some techniques used for paper-feeding trays and paper-receiving trays, for example, are shown in U.S. Pat. No. 5,379,121 to Yamada entitled *Portable Facsimile Apparatus*, U.S. Pat. No. 5,539,538 to Terao entitled *Facsimile Machine Having a Single Feeding Path for Document and Recording Sheet*, U.S. Pat. No. 5,552,902 to Kohno entitled *Facsimile Apparatus With Internal Mechanism for Conveying Originals and Recording Paper*, U.S. Pat. No. 5,559,609 to Yamada entitled *Facsimile Transceiver*, U.S. Pat. No. 4,279,504 to Brown entitled *Copier and Multifunction Paper Cassette*, U.S. Pat. No. 5,013,026 to Howell entitled *Sheet Stacking and Inverting Apparatus.*

Contemporary non-combination paper trays, however, are separately mounted on the facsimile body, thus requiring specialized component devices for installing the trays. Current combination paper supply and paper discharge trays use the same tray when attached to a versatile office machine, thus making it difficult for a user to remove paper from the combination tray without disrupting the use of the tray for the reception of ejected documents. Additionally, contemporary combination paper supply and paper discharge trays will not work in a versatile office machine that is not specifically designed for the particular combination tray. I believe it is possible to improve the art by providing a combination paper supply and paper discharge tray, that can work in versatile office machines not specifically designed to use a combination tray, that can be simply built, and that allows a user to remove discharged paper without interrupting the supply of paper to the office machine.

SUMMARY OF THE INVENTION

Accordingly, it is an object of the present invention to provide an improved combination paper supply tray and paper discharge tray.

It is another object to provide a paper supply tray that can be recessed into a paper discharge tray.

It is still another object to provide a combination paper supply and paper discharge tray that allows a user to remove paper that has been printed on by a versatile office machine without interfering with the operation of the paper supply tray.

It is yet another object to provide a combination paper supply and paper discharge tray that can be used exclusively as a paper discharge tray.

It is still yet another object to provide a combination paper supply and paper discharge tray that can be used with versatile office machines not specifically designed to use the combination paper supply and paper discharge tray.

It is a further object to provide a combination paper supply and paper discharge tray that has a simplified design and is economical to produce.

To achieve these and other objects, a combined paper supply and paper discharge tray for use in a facsimile may be constructed using a paper discharge tray that has an opening formed in a middle portion of the discharge tray. A first set of guide grooves are attached at an upper portion of the paper discharge tray and a second set of guide grooves are attached to the lower portion of the paper discharge tray. The paper discharge tray may be mounted on an upper rear side of the body of the facsimile with a predetermined slope. A set of L-shaped iron bars each have one end rotatably fixed around projecting poles that protrude from the lower portion of the paper discharge tray. The paper supply tray is positioned at the orifice that engages paper supply trays and has holes in an upper portion that the L-shaped iron bar rotatably insert into. This allows the paper supply tray to be extended from and recessed into the paper discharge tray. The paper discharge tray is attachable and detachable with the sheet loading orifice of the facsimile. Furthermore, the paper discharge tray has semicircular grooves that allow both the L-shaped bars and the abutting poles to recess flush into the paper stacker.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
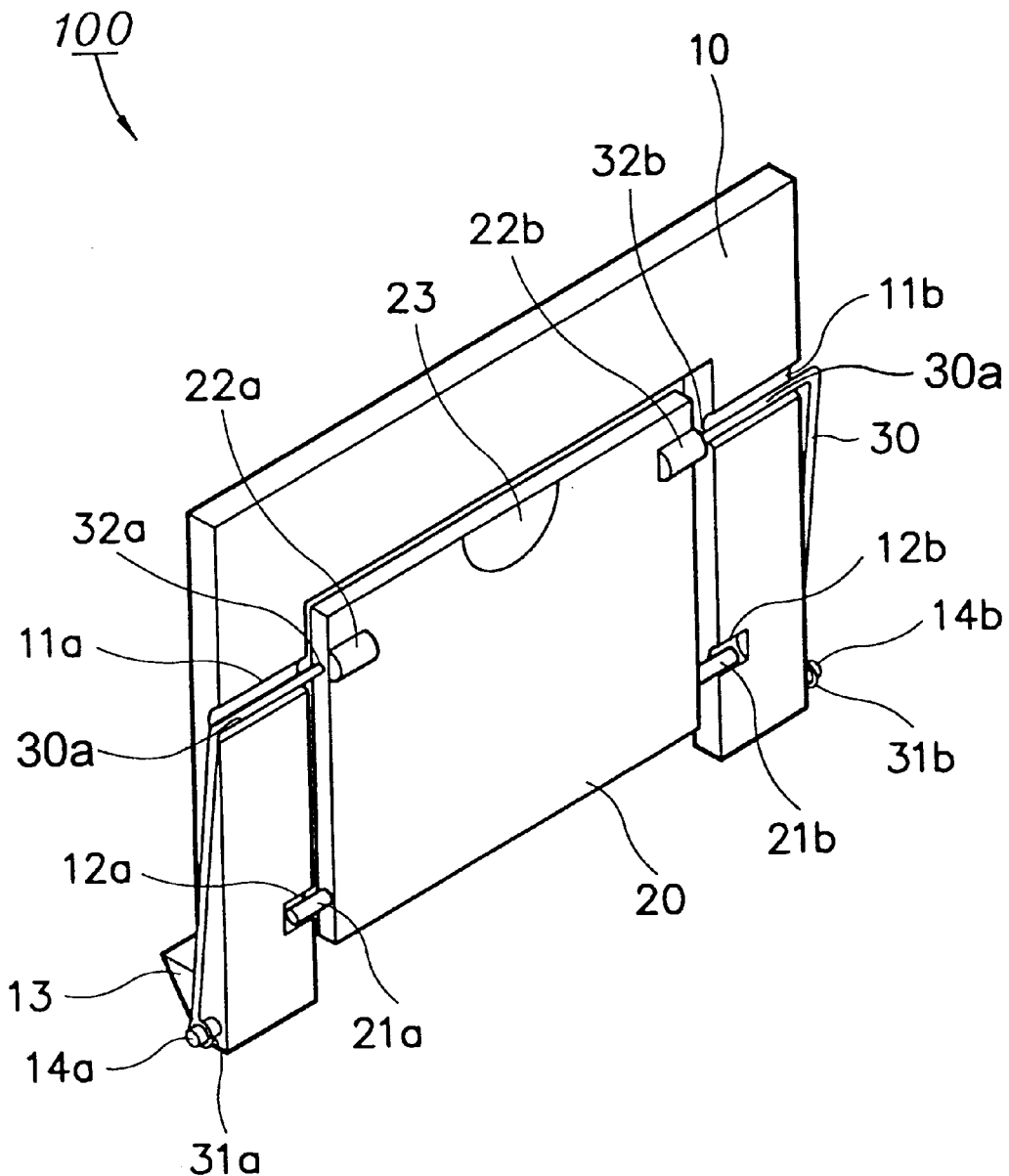
FIG. 1 is a perspective view of a combined paper supply tray and paper discharge tray as constructed according to the principles of the present invention with the paper supply tray recessed into the paper discharge tray.
Figure 2:
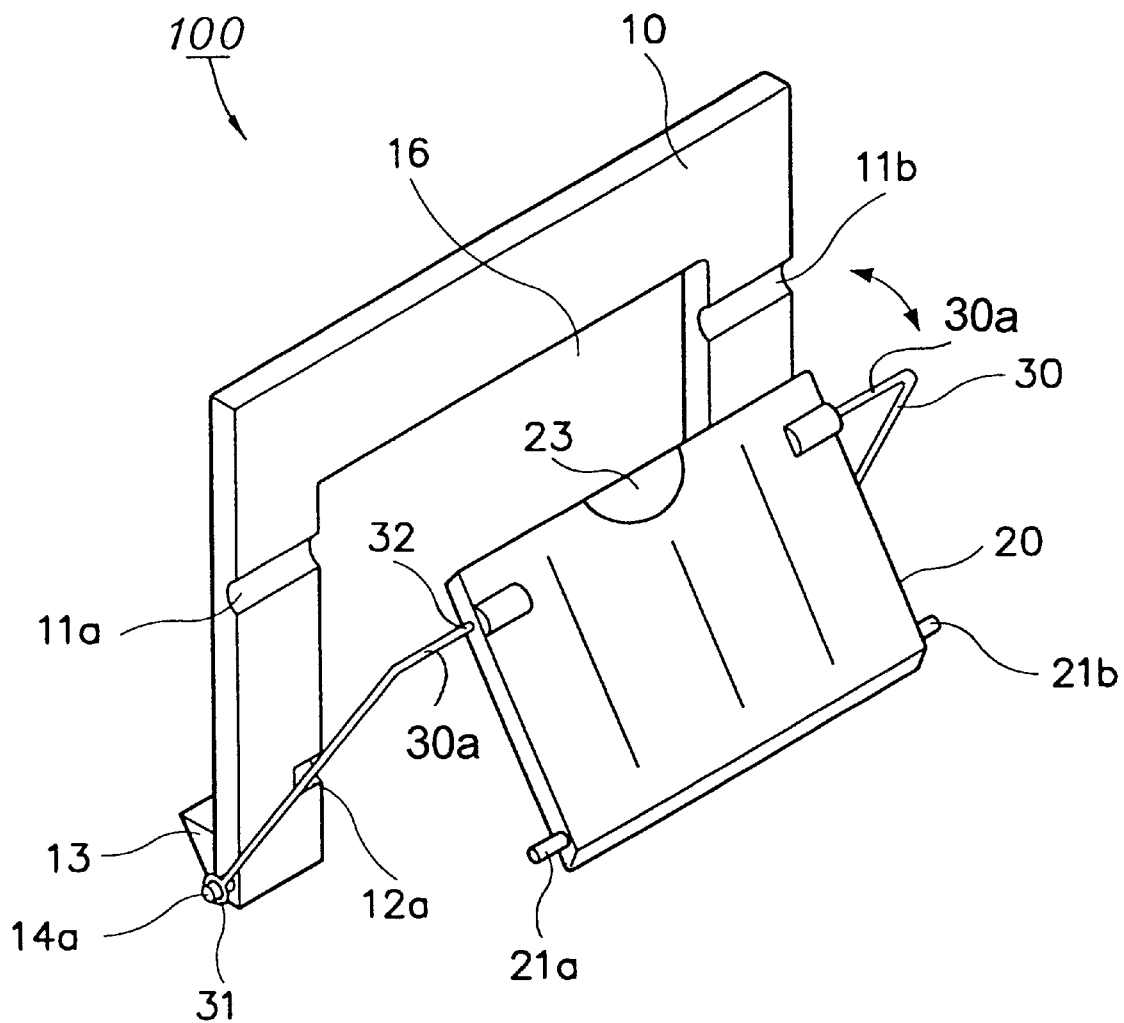
FIG. 2 is a perspective view of the combined paper supply and paper discharge tray of FIG. 1 with the paper supply tray extended from the paper discharge tray.

Turning now to the drawings, FIG. 1 illustrates combined paper supply and paper discharge tray 100 with paper supply tray 20 recessed into paper discharge tray 10. Paper discharge tray 10 can be fixed on the body of a versatile office machine, such as a facsimile, copier, or ink jet printer at a particular slope. Paper supply tray 20 is extendably attached to paper discharge tray 10 and, as such, can be unfolded from paper discharge tray 10, as shown in FIG. 2. L-shaped bars 30 are rotably attached to both paper discharge tray 10 and to paper supply tray 20.

Paper discharge tray 10 has uniaxial projecting poles 14a and 14b opposingly protruding outward from a bottom portion of the tray to engage the body of a facsimile. Paper discharge tray 10 has abutting angular protrusion 13 attached on the rear side of paper discharge tray 10 near uniaxial projecting poles 14a and 14b to allow paper stacker 10 to be held at a fixed angle against the body of the facsimile device. Furthermore, paper discharge tray 10 has opening 16 that allows paper supply tray 20 to be recessed within the paper discharge tray. In addition, guide grooves 11a and 11b allow segments 30a of L-shaped bars 30 to recess flush into the upper portion of paper discharge tray 10. Guide grooves 12a and 12b allow abutting poles 21a and 21b to recess flush into paper discharge tray 10 and are opposingly formed in the lower portion of paper discharge tray 10.

Paper supply tray 20 has abutting poles 21a and 21b opposingly protruding from a lower portion of the tray. Abutting poles 21a and 21b contact guide grooves 12a and 12b, respectively, when paper supply tray 20 is recessed into paper discharge tray 10. Ends 31a and 31b of L-shaped bars 30 are rotatably fixed around projecting poles 14a and 14b. Ends 32a and 32b of segment 30a of L-shaped bars 30 are inserted into holes 22a and 22b oppositely positioned in an edge along the upper portion of paper supply tray 20. Thus, when assembled, the paper supply tray 20 is rotatably extendable from and rotatably recessable into paper discharge tray 10. This allows the combination Inla paper supply and paper discharge tray to be used only as a paper discharge tray if a user desires. This is useful when a user does not need to supply paper to the image reading apparatus and only desires to receive a transmission representative of a document scanned at another location.

In operation, ends 31a and 31b of L-shaped bars 30 are rotatably fixed by projecting poles 14a and 14b, while ends 32a and 32b of L-shaped bars 30 are inserted into holes 22a and 22b. This allows paper supply tray 20 to be rotatably extendable from or rotatably recessed into paper discharge tray 10. When paper supply tray 20 is recessed into paper discharge tray 10, segments 30a of L-shaped fine iron bars 30 are also recessed into guide grooves 11a and 11b, so that paper supply tray 20 may be completely recessed into opening 16 of paper discharge tray 10. When paper supply tray 20 is fully recessed into paper discharge tray 10, abutting poles 21a and 21b of paper supply tray 20 will be recessed into guide grooves 12a and 12b. Thus, paper supply tray 20 may be secured in position inside opening 16 of paper discharge tray 10. It is preferable that guide grooves 11a, 11b, 12a and 12b are semicircular to allow the paper supply tray to easily recess into and extend out from paper supply tray 20.

Figure 3:
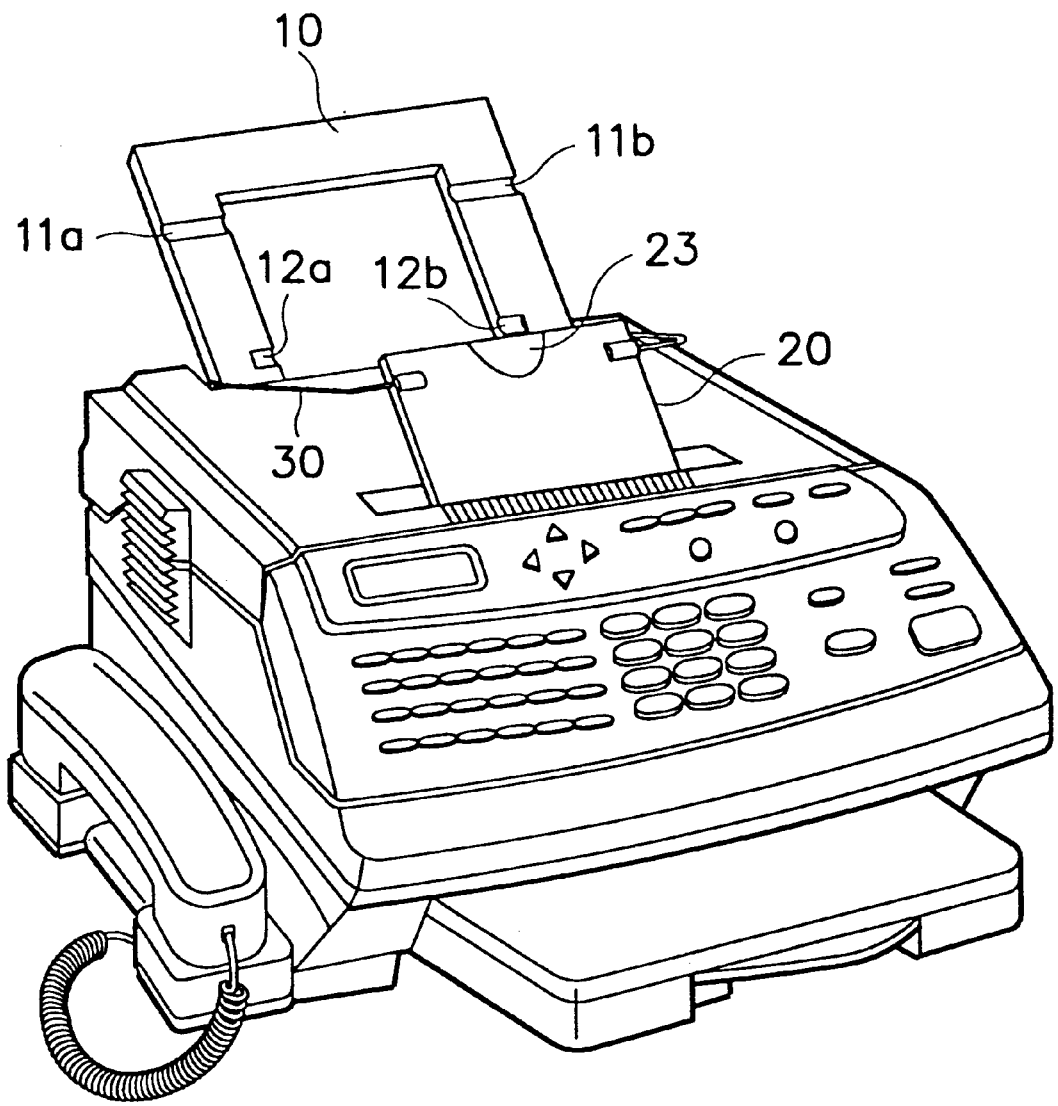
FIG. 3 shows an image forming apparatus engaged with the combination paper supply and paper discharge tray of FIG. 1.

FIG. 3 shows paper discharge tray mounted on the upper rear side of a facsimile body and also shows paper supply tray 20 mounted in the top side of the facsimile body. To attach the combination paper supply and paper discharge tray, a user first attaches the paper discharge tray to the upper rear side of the facsimile body. Then, by pressing indentation 23, located on the upper middle portion of paper supply tray 20, a user will cause paper supply tray 20 to unfold so that the paper supply tray can be inserted into the paper supply orifice located on the top side of the facsimile device. Once paper supply tray 20 is engaged with the paper supply orifice, L-shaped bars 30 hold paper supply tray 20 at a predetermined slope. To remove the paper supply tray a user removes paper supply tray 20 from the paper supply orifice of the facsimile device and folds the paper supply tray into paper discharge tray 10. When the paper supply tray is recessed into the paper discharge tray, the user can conveniently pick up the recording sheets stacked on paper discharge tray 10. Additionally, paper from either the paper stacker tray or the paper from the paper supply tray can be removed without disrupting the operation of the other tray. The simplified design of the combination paper supplying and paper discharge tray makes it easy to extend or retract the paper supply tray.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A multifunctional paper tray, comprising:
   a first tray for receiving cut sheets of paper ejected from a facsimile device, said first tray having a recess capable of holding in a second tray;
   said second tray supplying paper to said facsimile device and being retractable into said recess in said first tray;
   means for rotatably connecting said first tray to said second tray; and
   said first tray engagable with an ejection orifice of said facsimile device and said second tray engagable with a paper supply orifice of said facsimile device.

2. The multifunctional paper tray of claim 1, further comprised of said first tray having a pair of uniaxial poles protruding outward from opposing sides and engaging said ejection orifice of said facsimile device.

3. The multifunctional paper tray of claim 2, further comprising:
   said pair of uniaxial poles on said first tray being parallel to the plane of a base of said facsimile device and within the plane of said first tray;
   a pair of abutting protrusions on a side of said first tray allowing said tray to be supported at a predetermined angle; and
   a pair of L-shaped bars having one end rotatably fixed to said uniaxial poles on said first tray to extendably attach said second tray to said first tray.

4. The multifunctional paper tray of claim 3, with said second tray further comprising:
   a second pair of uniaxial poles protruding outward from opposing edges of said second tray for engaging said paper supply orifice of said facsimile device, said second pair of uniaxial poles being parallel to the plane of said base of said facsimile device and within the plane of said second tray; and
   a pair of uniaxial bores in opposing edges of said second tray that are parallel to said second pair of uniaxial poles, said pair of uniaxial bores rotably receiving a second end of said L-shaped members.

5. The multifunctional paper tray of claim 4, further comprised of said second tray having an indentation to simplify the manipulation of said second tray from being recessed into said first tray to being extended from said first tray.

6. The multifunctional paper tray of claim 5, further comprised of said first tray having a first pair of grooves symmetrically located to allow a leg of said L-shaped bars to recess into said first tray.

7. The multifunctional paper tray of claim 6, further comprised of said first tray having a second pair of grooves located adjacent to said recess and symmetrically oriented on opposing sides of said recess to allow said second pair of uniaxial poles to recess flush into said first tray.

8. The multifunctional paper tray of claim 7, further comprised of said first pair of grooves and said second pair of grooves being semi-circular.

9. The multifunctional paper tray of claim 8, further comprised of said multifunctional tray being usable as either one of a paper tray to receive cut sheets of paper ejected from said facsimile device only and as both a paper tray to receive cut sheets of paper ejected from said facsimile and a paper tray to supply cut sheets of paper to said facsimile device.

10. The multifunctional paper tray of claim 1, further comprised of said second tray engaging said paper supply orifice of said facsimile device and capable of holding cut sheets of paper that are fed into said facsimile device.

11. The multifunctional paper tray of claim 1, with said recess being located adjacent to a bottom side of said first tray.

12. A combined sheet-feeding stacker and sheet-receiving stacker for use in a facsimile, comprises:

a sheet-receiving stacker having a perforation, a first pair of guide grooves positioned in an upper portion of said sheet-receiving stacker, and a second pair of guide grooves formed at a lower portion of said sheet-receiving stacker, said sheet-receiving stacker being mounted on an upper rear side of a body of the facsimile with a predetermined slope;

a set of bars each being rectangularly bent, said set of bars having one end rotatably fixed around poles protruding from opposing sides of said sheet-receiving stacker at a lower portion of said sheet-receiving stacker;

a sheet-feeding stacker recessable flush in said perforation and having holes that have a second end of said set of bars rotatably inserted; and said sheet-feeding stacker may be extended from and recessed into said sheet-receiving stacker, said sheet-receiving stacker being both attachable to and detachable from a sheet feeder of said facsimile.

13. The combined sheet-feeding stacker and sheet-receiving stacker according to claim 12, wherein said first and second guide grooves are semicircular.

14. A multifunctional paper tray, comprising:

a first tray for receiving cut sheets of paper ejected from a facsimile device, said first tray having a recess capable of holding in a second tray and having a pair of uniaxial poles protruding outward from opposing sides and engaging said ejection orifice of said facsimile device;

said second tray engagable with said paper supply orifice of said facsimile device and capable of holding cut sheets of paper that are fed into said facsimile device;

said second tray being retractable into said recess in said first tray;

a pair of bars rotatably connecting said first tray to said second tray; and said first tray engagable with an ejection orifice of said facsimile device and said second tray engagable with a paper supply orifice of said facsimile device.

15. The multifunctional paper tray of claim 14, further comprising:

said pair of uniaxial poles on said first tray being parallel to the plane of a base of said facsimile device and within the plane of said first tray;

a pair of abutting protrusions on a side of said first tray allowing said tray to be supported at a predetermined angle; and said pair of bars being L-shaped and having one end rotatably fixed to said uniaxial poles on said first tray to extendably attach said second tray to said first tray.

16. The multifunctional paper tray of claim 15, with said second tray further comprising:

a second pair of uniaxial poles protruding outward from opposing edges of said second tray for engaging said paper supply orifice of said facsimile device, said second pair of uniaxial poles being parallel to the plane of said base of said facsimile device and within the plane of said second tray; and a pair of uniaxial bores in opposing edges of said second tray that are parallel to said second pair of uniaxial poles, said pair of uniaxial bores rotably receiving a second end of said L-shaped members.

17. The multifunctional paper tray of claim 16, further comprised of said second tray having an indentation to simplify the manipulation of said second tray from being recessed into said first tray to being extended from said first tray.

18. The multifunctional paper tray of claim 17, further comprised of said first tray having a first pair of grooves symmetrically located to allow a leg of said L-shaped bars to recess into said first tray.

19. The multifunctional paper tray of claim 18, further comprised of said first tray having a second pair of grooves located adjacent to said recess and symmetrically oriented on opposing sides of said recess to allow said second pair of uniaxial poles to recess flush into said first tray.

20. The multifunctional paper tray of claim 19, further comprised of said first pair of grooves and said second pair of grooves being semi-circular.

21. The multifunctional paper tray of claim 20, further comprised of said multifunctional tray being usable as either one of a paper tray to receive cut sheets of paper ejected from said facsimile device only and as both a paper tray to receive cut sheets of paper ejected from said facsimile and a paper tray to supply cut sheets of paper to said facsimile device.

* * * * *